Sept. 4, 1962 W. SCHROEDER 3,052,334
TRANSMISSION CREEP MECHANISM FOR MACHINE TOOL
Filed July 11, 1960 3 Sheets-Sheet 1

INVENTOR.
WALTER SCHROEDER
BY
ATTORNEYS

INVENTOR.
WALTER SCHROEDER
BY
ATTORNEYS

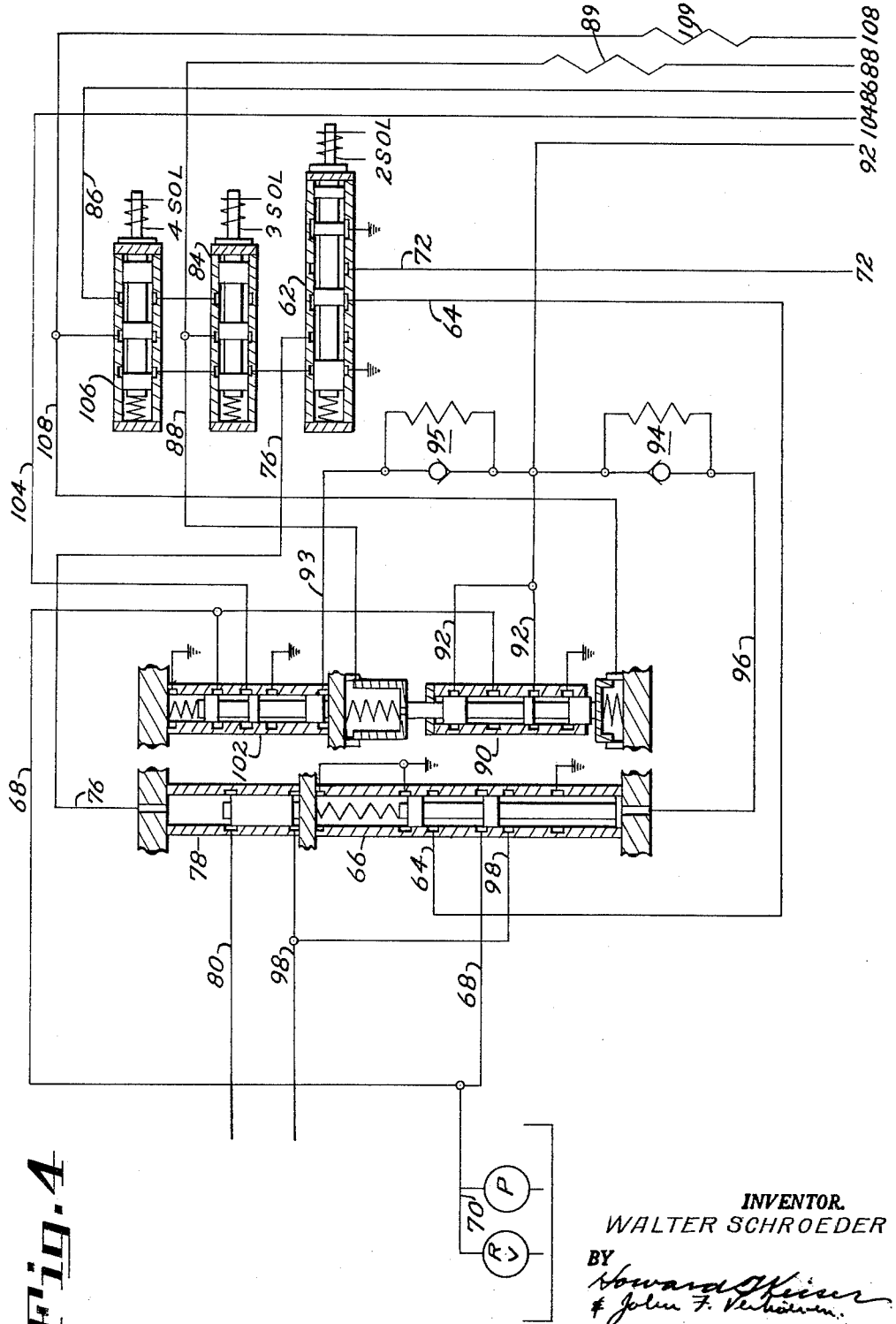

3,052,334
TRANSMISSION CREEP MECHANISM FOR MACHINE TOOL
Walter Schroeder, Cincinnati, Ohio, assignor to The Cincinnati Milling Machine Company, Cincinnati, Ohio, a corporation of Ohio
Filed July 11, 1960, Ser. No. 42,168
2 Claims. (Cl. 192—4)

This invention relates to a transmission mechanism and, more particularly, to a mechanism to run the transmission at a creep speed.

A gear mechanism to greatly reduce a fixed speed of rotation is useful in a machine tool having a system of speed change gears that are shiftable in selected combinations to provide a range of drive speeds for a spindle or similar member. The greatly reduced speed is utilized during shifting of the speed change gears to cause the gears to creep slowly. The slow movement of the gears allows shifting to be accomplished with a minimum of interference between gear teeth, thus reducing wear, noise, and required energy when a shift is made.

An object of this invention is to provide an improved mechanism to produce a creep speed in speed change gears during the time that gear shifting is accomplished. Another object of the present invention is to provide in the creep mechanism a system capable of braking the output shaft from an operating speed as well as driving said shaft at a creep speed.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The operation and construction of the creep mechanism is described in the following detailed description with reference made to the attached drawings in which:

FIG. 4 is a hydraulic operating circuit for the mechanism of FIG. 1.

Figure 1:
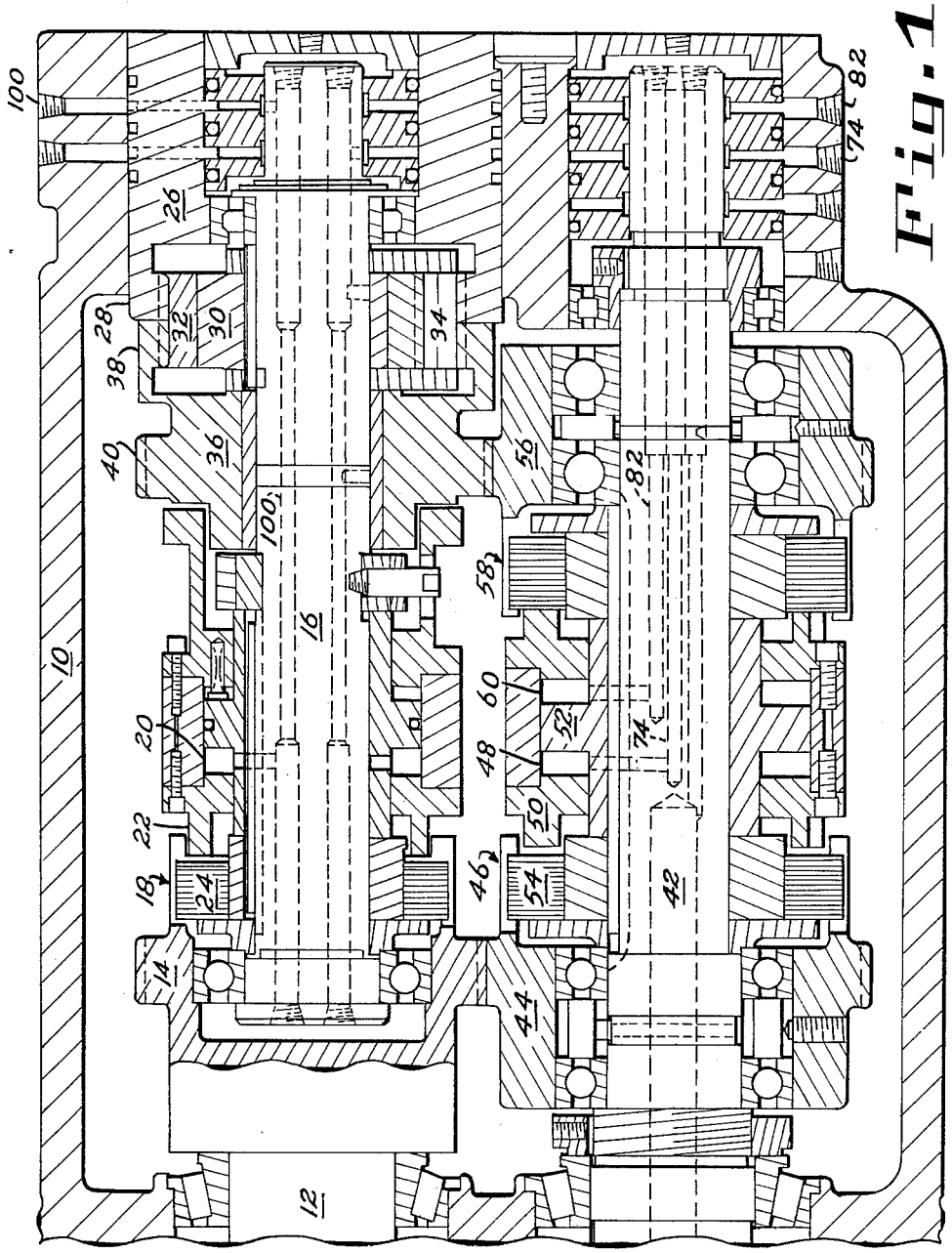
FIG. 1 is a sectional view of the creep mechanism of the present invention.
Figure 2:
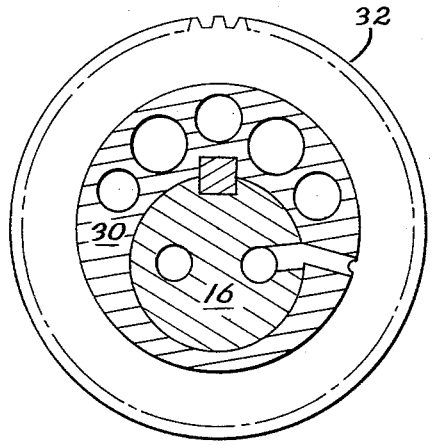
FIG. 2 is a section of an eccentric gear mounting in the mechanism of FIG. 1.
Figure 3:
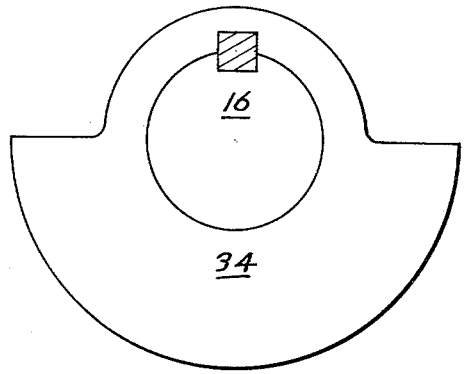
FIG. 3 shows a counterweight member in the mechanism of FIG. 1.

FIG. 1 shows a machine tool housing 10 in which a creep speed reduction gearing mechanism is mounted. The input shaft 12 is constantly rotated by a motor (not shown). The input shaft has a drive gear portion 14 integral therewith. Abutting the input shaft is the drive shaft 16 which is rotatably mounted. A first clutch 18 is received on the drive shaft and is operable to selectively connect the drive shaft and input shaft when fluid under pressure is introduced into the cavity 20 which causes the plunger ring 22 to compress the clutch plates 24. The input shaft and drive shaft rotate together when the clutch plates are compressed by the plunger. The end of the drive shaft opposite the end on which the first clutch is received is rotatably received in an internal ring gear member 26 which is fixed in the machine housing. The internal ring gear has a toothed gear portion 28 located around a portion of the drive shaft 16. Fixed on the drive shaft 16 and extending into the ring gear member 26 is an eccentric bushing 30. (See also, FIG. 2.) The bushing 30 loosely receives a pinion gear 32 which is engaged with the toothed portion of the internal ring gear member. Fixed on the drive shaft 16 on either side of the eccentric bushing 30 are counterweight members 34 (FIG. 3) which restore balance to the drive shaft and suppress machine vibrations that would be caused by the unbalance resulting from the eccentric bushing. Adjacent to the one counterweight member is a gear member 36 which is loosely received on the drive shaft. The gear member 36 has an internal toothed portion 38 engaged with the eccentrically mounted pinion 32 and an external toothed portion 40. The internal toothed portion 38 and the toothed portion 28 of the internal ring gear 26 have a different number of teeth therein.

Located below the drive and input shafts is the output shaft 42 which is rotatably received in the housing 10. The output shaft has a first driven gear 44 received thereon and engaged with the driving gear 14 on the input shaft. The first driven gear 44 may be fixed relative to the output shaft by engagement of the second clutch 46 received on the output shaft. When fluid under pressure is applied to the cavity 48 between the ring plunger 50 and the shoulder 52 of the output shaft, the clutch plates 54 are compressed and the first driven gear and output shaft rotate together. Also received on the output shaft 42 is a second driven gear 56 engaged with the external toothed portion 40 of the gear member 36. A third clutch 58 is received on the output shaft adjacent to the second driven gear and is engaged when fluid under pressure is introduced in the cavity 60 to relatively fix the output shaft and the second driven gear. A bevel gear (not shown) is fixed on the left end of the output shaft and is connected through gearing to the speed change gears (not shown) which in turn are operatively connected to drive a spindle (not shown).

In normal operation of the machine with the spindle running, the second clutch 46 is engaged by fluid under pressure in the cavity 48 and the input shaft 12 rotates the output shaft 42 at a speed determined by the ratio of the number of teeth between the driving gear 14 and the first driven gear 44. When the second clutch 46 is engaged, the first clutch 18 and the third clutch 58 are disengaged. If the spindle is stopped, the first clutch 18 may be engaged and in the engaged condition, fixes the drive shaft 16 relative to the input shaft 12. When this occurs, the eccentric portion rotates and causes the eccentrically mounted pinion 32 to be engaged at a point with the internal portion of ring gear member 26. The point of engagement moves around that ring gear making a complete turn around the internal ring gear for each rotation of the input and drive shafts. The eccentrically mounted pinion 32 is also engaged with the loosely mounted internal toothed gear portion 38 of the gear member 36 which has a different number of teeth than the fixed internal ring gear member 26. For each rotation of the input shaft, the loosely received gear member 36 will move only a fraction of a rotation relative to the fixed internal ring gear 26. The fraction of movement will be equal to the fraction represented by the ratio of the difference in number of teeth between the internal ring gear and the internal toothed portion of the gear member and the number of teeth in the internal gear portion. Thus, if the fixed gear has 48 teeth and the internal portion 38 has 49 teeth, the movable gear member will move relative to the fixed ring gear only $\frac{1}{49}$th of a revolution for each revolution of the drive shaft and the external portion 40 of the movable gear member 36 would drive the second driven gear 56 at $\frac{1}{49}$th of the speed of the input shaft if the external portion 40 and the second driven gear 56 had a 1 to 1 ratio of teeth. If the movable internal gear has 47 teeth the direction of rotation of the internal gear portion relative to the fixed gear would be reversed and the fraction of movement would be 1/47th of a revolution for each revolution of the drive shaft.

If the third clutch 58 is engaged at the same time the first clutch 18 is engaged, the output shaft and second driven gear rotate together at a speed determined by the driving speed of the external gear portion 40. As has been pointed out, a great speed reduction is possible with a difference in the number of teeth in the internal gears. This great reduction is used during the time that the speed change gears are to be shifted to produce a creep speed therein. The slow revolution of the speed change gears at the creep speed allows quick and easy meshing of shifter gears without the clashing of gears to cause damage thereto.

If the third clutch is engaged and the first clutch is not engaged, the creep speed gearing acts as a brake to restrain rotation of the machine spindle. The creep speed gearing is an irreversible system and the output shaft is unable to rotate the gears. The slippage inherent in the third clutch will dissipate the energy of the rotating spindle very quickly. The load presented by the creep speed gears will hold the spindle stationary once the output shaft has stopped rotating and as long as the first clutch is not engaged.

Figure 5:
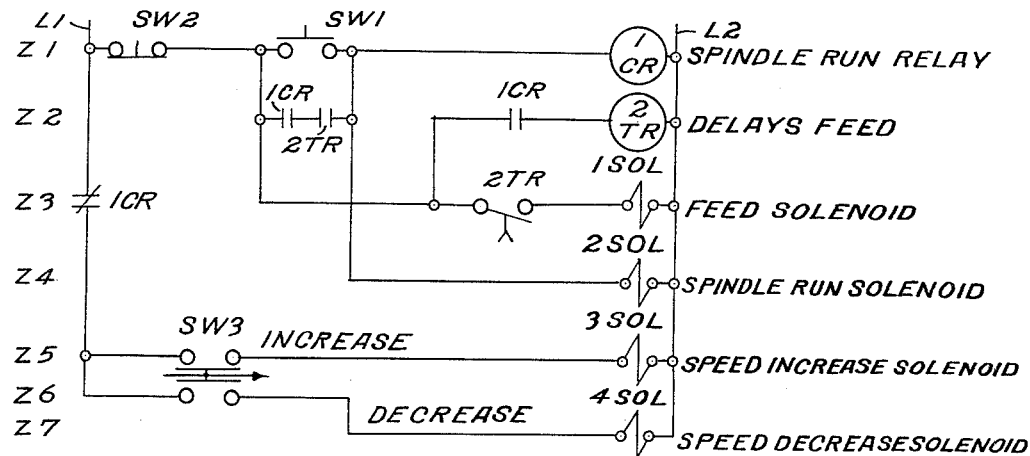
FIG. 5 is an electrical control diagram for the mechanism of FIG. 1.

Referring now to FIGS. 4 and 5 the hydraulic and electrical control circuits for the clutches in the mechanism are described. Assuming the gears to be in a selected combination and the spindle in an initial stopped condition, the spindle start switch SW1 (Z1, FIG. 5) is depressed. Immediately, control relay 1CR (Z1) picks up and the feed delay timer 2TR (Z2), energized through contacts of that relay, begins to time a delay period. When relay 1CR picked up, the relay contacts indicated at Z3 open and control voltage line L1 is opened with respect to the speed select portion of the circuit and the speed select switch SW3 (Z5). The spindle start solenoid 2SOL (Z4) is also energized when switch SW1 is closed. When the solenoid 2SOL is energized, the plunger of valve 62 (FIG. 4) shifts to the left. Line 64 is a controlled pressure line from valve 66 where it connects to the full pressure line 68 from the source 70 at this time. When the valve plunger in valve 62 shifts left, pressure from line 64 is then connected to line 72 which connects directly to the fluid passage 74 (FIG. 1) and applies pressure to the cavity 48 to engage the second clutch 46 and the spindle begins to rotate. At the end of the timed period set by timer 2TR (Z2, FIG. 5) to allow the spindle to reach full speed, the solenoid 1SOL (Z3) is energized and the feed valve (not shown) shifts to allow feed of a workpiece relative to the spindle.

Upon completion of an operation, the spindle stop switch SW2 (Z1, FIG. 5), is opened and solenoids 1SOL (Z3) and 2SOL (Z4) are deenergized. The contacts of the relay 1CR at Z3 also close and control voltage is available at switch SW3. Feed movement is stopped. Valve 62 (FIG. 4) shifts back to the position shown, and pressure from line 64 is reconnected to line 76 which holds valve 78 in the position shown. Line 76 connects to the brake line 80 through the valve 78 and applies pressurized fluid to the passage 82 (FIG. 1) which engages the third clutch 58 and stops the spindle. The second clutch is disengaged since valve 62 (FIG. 4), as shown, connects the second clutch line 72 to drain.

A spindle speed change may now be made by action of the speed increase-decrease switch SW3 (Z5, 6, FIG. 5). With switch SW3 held in the speed increase position, solenoid 3SOL (Z5) is energized. The plunger of valve 84 (FIG. 4) is caused to shift to the left. Line 86 is a control pressure line from a source (not shown) and applies pressure through valve 106 and valve 84 to line 88 which connects to valve 90. Pressure is also applied through line 88 to a distribution valve (not shown) to speed change shifters (not shown). Valve 90 is caused to shift downward and to connect line 92 with the full pressure line 68. Pressure from line 92 is applied through ball check valve of the time delay 94 to the valve 66 through line 96. When pressure is in line 96, valve 66 is caused to shift upward and to connect the pressure line 68 to the first clutch line 98 which connects to fluid conduit 100 (FIG. 1) and engages the first clutch 18. A branch of line 98 (FIG. 4) connects to valve 78 and the pressure causes the plunger of that valve to shift upward. The third clutch line 80 is then connected to pressure with the first clutch and the speed change gears rotate at the creep speed as described. Pressure from line 92 is also applied through line 93 and the ball check valve of time delay 95 to valve 102 which is caused to shift upward and to connect the speed selector valve return line 104 to drain. Pressure from the increase speed valve 84 is also present in line 88 which connects to the rotary speed select valve (not shown) through a time delay resistance 89 which allows the spindle to stop before shifting takes place. The speed select valve is energized and rotates. As the speed select valve rotates, pressure from line 92 is also applied to the shifters (not shown) to cause them to move the speed change gears into predetermined increased speed combinations. When the speed change gears are in the desired combinations, the speed select switch SW3 (Z5, 6, FIG. 5) is released and solenoid 3SOL (Z5) is deenergized. Pressure is removed from line 88 (FIG. 4) and the valves 66, 78, 90, and 102 return to the positions shown, after a brief delay set in by time delays 94 and 95. This leaves the third clutch 58 (FIG. 1) engaged and the first clutch 18 and the second clutch 46 disengaged.

Should a speed decrease be desired, selector switch SW3 (Z5, 6, FIG. 5) is held in the decrease speed position and solenoid 4SOL (Z7) is energized. The plunger of valve 106 (FIG. 4) is caused to shift to the left and to connect the pressure of line 86 to line 108. When pressure is applied to line 108, the valve 90 shifts upward and connects pressure to line 92. The valves 66, 78, and 102 shift to the positions described to effect a speed increase, and the third clutch 58 (FIG. 1) and first clutch 18 are engaged. Creep speed motion is again produced at the output shaft 42. Line 108 (FIG. 4) which has pressure now connects with the speed select valve through the time delay resistance 109 and causes it to move in a direction opposite to that in which it moved during the speed increase condition and the speed change shifters cause the gears to shift into combinations to produce slower spindle speeds. When the selector switch SW3 (Z5, 6) is released, the solenoid 4SOL (Z7) is deenergized and the circuit returns again to the condition when the spindle is stopped and the third clutch is engaged.

What is claimed is:

1. An irreversible drive gear mechanism operable as a brake and a creep speed drive transmission comprising in combination, a rotatable drive shaft having an eccentric portion, a rotatable output shaft, an internal toothed ring gear fixed relative to and concentric with said drive shaft and extending around said eccentric portion, a gear member loosely received on said drive shaft adjacent said eccentric portion and having an external toothed gear portion and an internal toothed gear portion, said internal toothed gear portion adjacent to said internal toothed ring gear and having a slight difference in number of teeth relative thereto, a pinion gear loosely received on said eccentric portion and engaged with said internal ring gear and internal toothed gear portion, said pinion operable to effect rotation of said gear member when said drive shaft is rotated, means operable to effect rotation of said drive shaft, and means selectively operable to connect said output shaft to said gear member to effect rotation thereby when said drive shaft is rotated and to brake rotation of said output shaft when said drive shaft is not rotated.

2. A transmission including an irreversible drive gear mechanism operable as a brake and a creep speed drive, the combination comprising, an input shaft rotating at a fixed speed and having a driving gear fixed thereon, a rotatable output shaft having first and second driven gears loosely received thereon, said first driven gear engaged with said driving gear, a rotatable drive shaft having an eccentric portion, an internal toothed ring gear fixed relative to and concentric with said drive shaft and extending around said eccentric portion, a gear member loosely received on said drive shaft adjacent said eccentric portion and having an external toothed gear portion engaged with said second driven gear and an internal toothed gear portion adjacent to said internal ring gear having a slight difference in number of teeth relative thereto, a pinion gear loosely received on said eccentric portion and engaged with said internal ring gear and internal toothed gear portion, said pinion operable to effect rotation of said gear member when said drive shaft is rotated, a first clutch engageable to connect said input shaft and said drive shaft together, a second clutch engageable to fix said first driven gear on said output shaft, a third clutch engageable to fix said second driven gear on said output shaft, means selectively to engage said second clutch to effect rotation of said output shaft, means to prevent engagement of said first and third clutches when said second clutch is engaged, means selectively to engage said third clutch for connection of said output shaft to said gear member to brake rotation of said output shaft, means to prevent engagement of said second clutch when said third clutch is engaged, and means selectively to engage said first clutch when said third clutch is engaged to effect rotation of said output shaft at a creep speed during a shifting period.

References Cited in the file of this patent

UNITED STATES PATENTS

| | | |
|---|---|---|
| 2,250,259 | Foote | July 22, 1941 |
| 2,342,149 | Kinser | Feb. 22, 1944 |
| 2,913,064 | Ferguson et al. | Nov. 17, 1959 |